United States Patent
Bachtiger et al.

(10) Patent No.: US 11,120,199 B1
(45) Date of Patent: Sep. 14, 2021

(54) SYSTEMS FOR TRANSCRIBING, ANONYMIZING AND SCORING AUDIO CONTENT

(71) Applicant: VoiceBase, Inc., San Francisco, CA (US)

(72) Inventors: Walter Bachtiger, Novato, CA (US); Bruce Ramsay, Campbell, CA (US)

( * ) Notice: Subject to any disclaimer, the term of this patent is extended or adjusted under 35 U.S.C. 154(b) by 171 days.

(21) Appl. No.: 16/269,584

(22) Filed: Feb. 7, 2019

Related U.S. Application Data

(60) Provisional application No. 62/628,308, filed on Feb. 9, 2018.

(51) Int. Cl.
| | |
|---|---|
| G10L 15/26 | (2006.01) |
| G06F 21/60 | (2013.01) |
| G06F 21/62 | (2013.01) |
| G06F 40/166 | (2020.01) |
| G06F 40/30 | (2020.01) |

(52) U.S. Cl.
CPC .......... G06F 40/166 (2020.01); G06F 21/60 (2013.01); G06F 21/6245 (2013.01); G06F 21/6254 (2013.01); G06F 40/30 (2020.01); G10L 15/26 (2013.01)

(58) Field of Classification Search
CPC . G10L 15/26; G06F 21/6254; G06F 21/6245; G06F 21/60
See application file for complete search history.

(56) References Cited

U.S. PATENT DOCUMENTS

| | | | |
|---|---|---|---|
| 9,058,813 B1 * | 6/2015 | Blanksteen | G06F 40/279 |
| 2013/0289984 A1 * | 10/2013 | Hakkani-Tur | G06F 16/215 |
| | | | 704/235 |
| 2015/0195406 A1 * | 7/2015 | Dwyer | G06F 21/6254 |
| | | | 379/265.07 |
| 2016/0364377 A1 * | 12/2016 | Krishnamurthy | G06F 40/30 |
| 2017/0019356 A1 * | 1/2017 | Gilbert | G06Q 30/016 |
| 2017/0374502 A1 * | 12/2017 | Gabel | G06Q 50/188 |
| 2019/0156222 A1 * | 5/2019 | Emma | G06N 5/022 |
| 2019/0237083 A1 * | 8/2019 | Allen | G09B 5/00 |

* cited by examiner

*Primary Examiner* — Bryan S Blankenagel

(57) ABSTRACT

Systems for transcribing, redacting, and scoring audio content are disclosed. The systems include at least one machine that has a central processing unit, random access memory, a transcription module, a redaction module, and at least one database in communication with the machine. The transcription module is configured to receive a plurality of audio files generated by a plurality of different sources, execute speech-to-text transcriptions based on such audio content, and generate written transcripts of such transcriptions. The redaction module is configured to identify personally identifiable information included in the written transcripts and anonymize such personally identifiable information to create anonymized written transcripts. The database is configured to receive, record, and make accessible for searching and review the anonymized written transcripts generated by the redaction module.

13 Claims, 4 Drawing Sheets

SYSTEMS FOR TRANSCRIBING, ANONYMIZING AND SCORING AUDIO CONTENT

CROSS-REFERENCE TO RELATED APPLICATIONS

This application is a non-provisional application of, and claims priority to, U.S. provisional patent application Ser. No. 62/628,308, filed on Feb. 9, 2018.

FIELD OF THE INVENTION

The field of the present invention relates to systems and methods for analyzing audio content. More specifically, the present invention relates to systems and methods that are configured to transcribe audio content into text; redact or anonymize personally identifiable information included within the transcribed text; and further transfer and process the anonymized transcribed text for subsequent classifications, scorings, rankings, and other analyses associated with the original audio content (with such classifications, scorings, rankings, and other analyses being performed by the system itself; by human operators (with the benefit of personally identifiable information having been redacted); or by both the system and human operators).

BACKGROUND OF THE INVENTION

Businesses and other organizations would benefit from an improved ability to extract relevant information and data from conversations that employees have with existing customers, prospective customers, collaborators, other third parties, and within their own organization. In some cases, however, when representatives of a business or organization have many contacts, and engage in many of such conversations on a day-to-day basis, the volume of such conversations can make extracting relevant information and data very challenging—and potentially very time consuming. In addition, extracting such information and data from a plurality of such conversations in a systematic, standardized, and preferably quantitative manner can be difficult. To further complicate matters, many of the conversations of interest to businesses and other organizations often include personally identifiable information (PII). Of course, unauthorized disclosure and/or uses of such personally identifiable information can produce significant legal (both civil and criminal) liability for such businesses and other organizations.

Accordingly, it would be advantageous to provide systems and methods that could be used to systematically, efficiently, and quantitatively analyze such conversations; extract relevant information and data from such conversations (both at the individual and aggregate levels); redact or anonymize all personally identifiable information contained in such conversations; and report such data to a user (preferably in a way that such information and data could later be searched, mined, and reviewed by human operators without exposure to personally identifiable information of others).

As described further below, the present invention addresses many of these (and other) demands in the marketplace.

SUMMARY OF THE INVENTION

According to certain aspects of the present invention, systems and methods for transcribing, redacting, and scoring audio content are provided. More particularly, the systems include at least one machine that has a central processing unit, random access memory, a transcription module, a redaction module, an optional scoring module, and at least one database in communication with the machine. The transcription module is configured to receive a plurality of audio files generated by a plurality of different sources, execute speech-to-text transcriptions based on such audio content, and generate written transcripts of such transcriptions. The redaction module is configured to identify personally identifiable information included in the written transcripts and anonymize such personally identifiable information to create anonymized written transcripts. More specifically, in certain preferred embodiments, the redaction module is configured to replace numeric forms of personally identifiable information (whether presented as numerals or words that represent numerals in the underlying transcripts) with randomized numbers or symbols. The optional scoring module is configured to assign a score to each of the anonymized written transcripts (or portions thereof) based on various types of metadata associated with the audio content and transcripts and/or based on the presence of certain words, word relationships, and other semantic content. The invention provides that the database of the system is configured to receive, record, and make accessible for searching and review (either by the system itself, human operators, or both) the anonymized written transcripts generated by the redaction module (and, optionally, the scores produced by the scoring module described herein).

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

Figure 1:
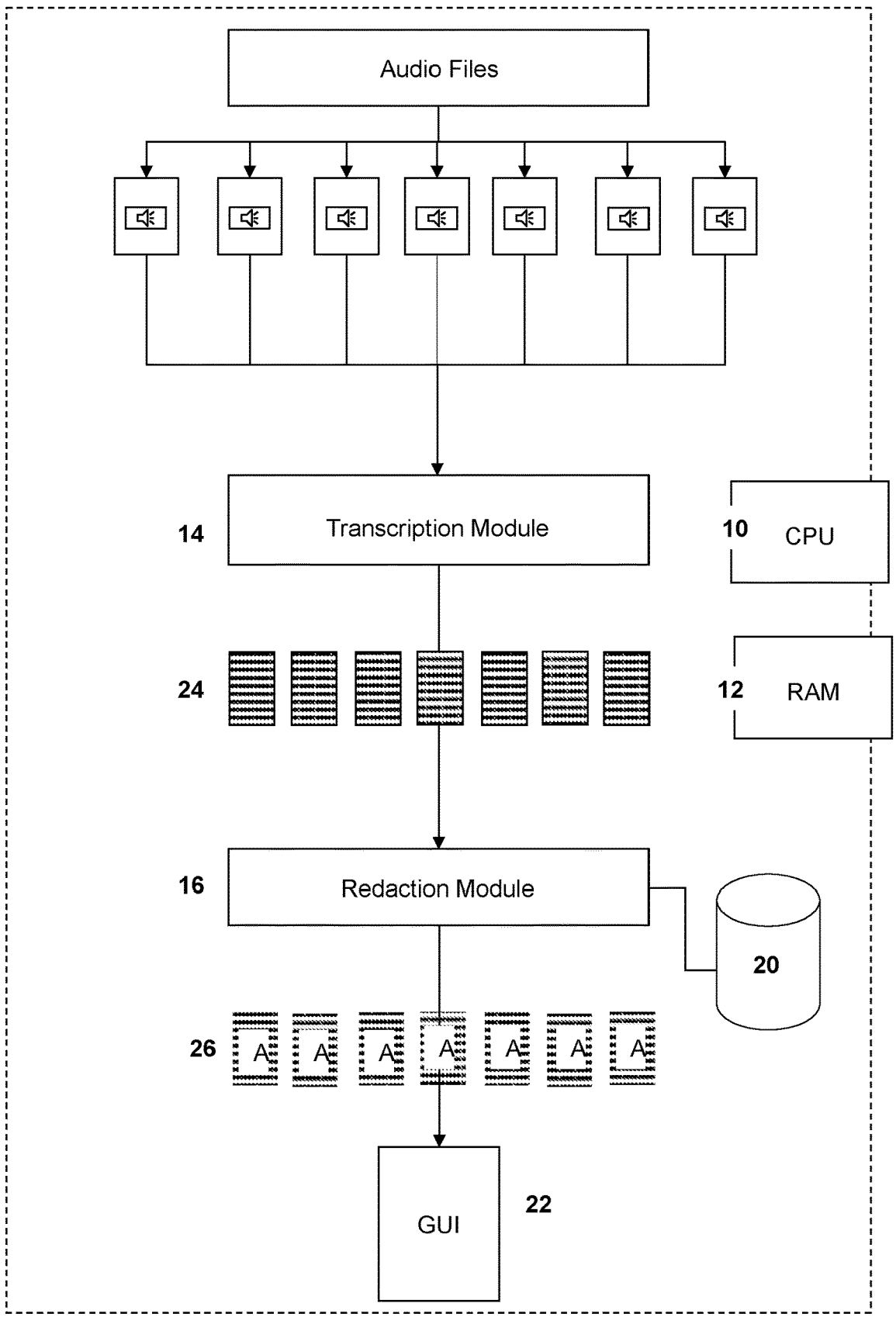
FIG. 1 is a diagram that illustrates certain components of the systems described herein, in which the transcription module, redaction module, database, and user interface are all shown.
Figure 2:
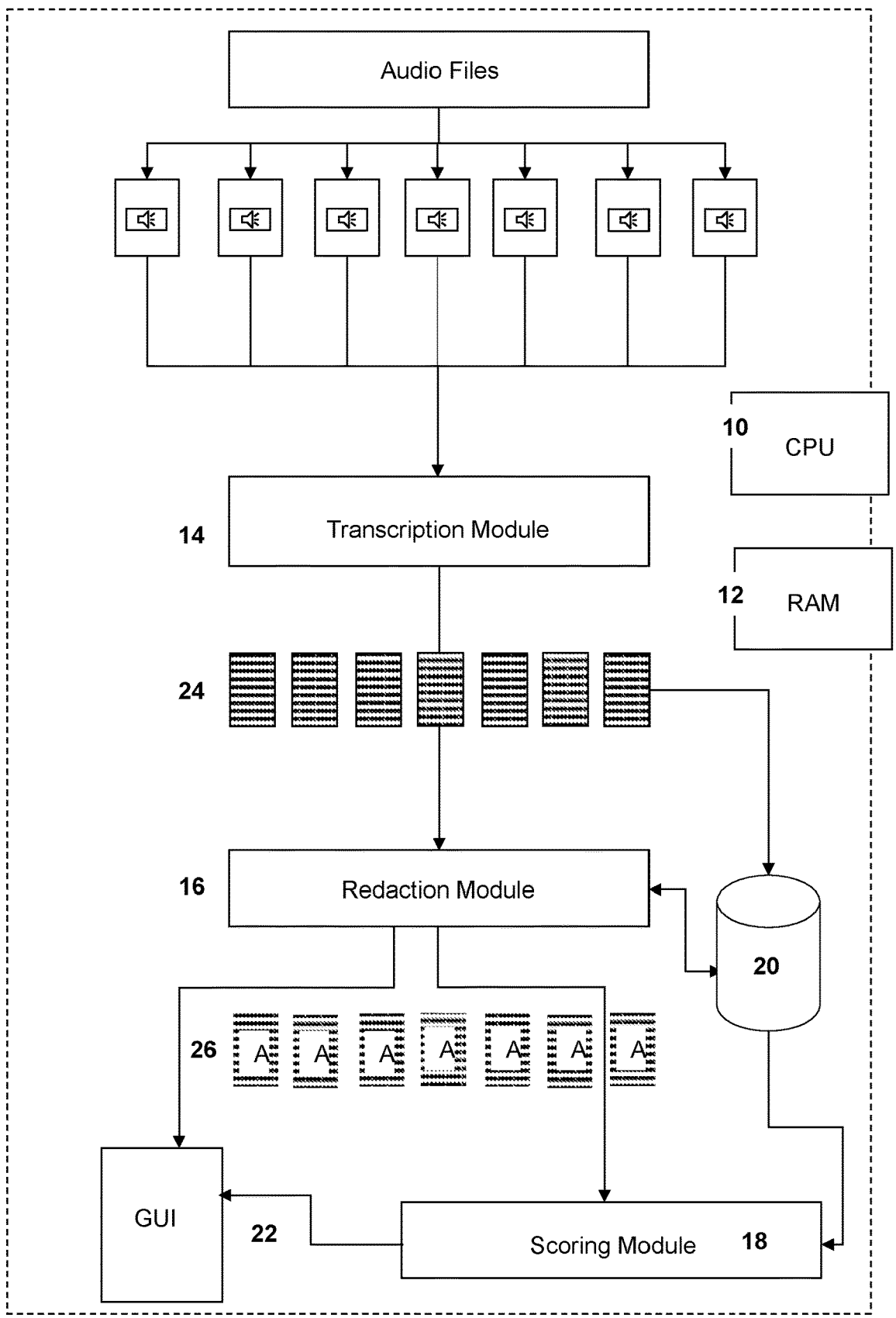
FIG. 2 is another diagram that illustrates certain components of the systems described herein, in which the transcription module, redaction module, scoring module, database, and user interface are all shown.
Figure 3:
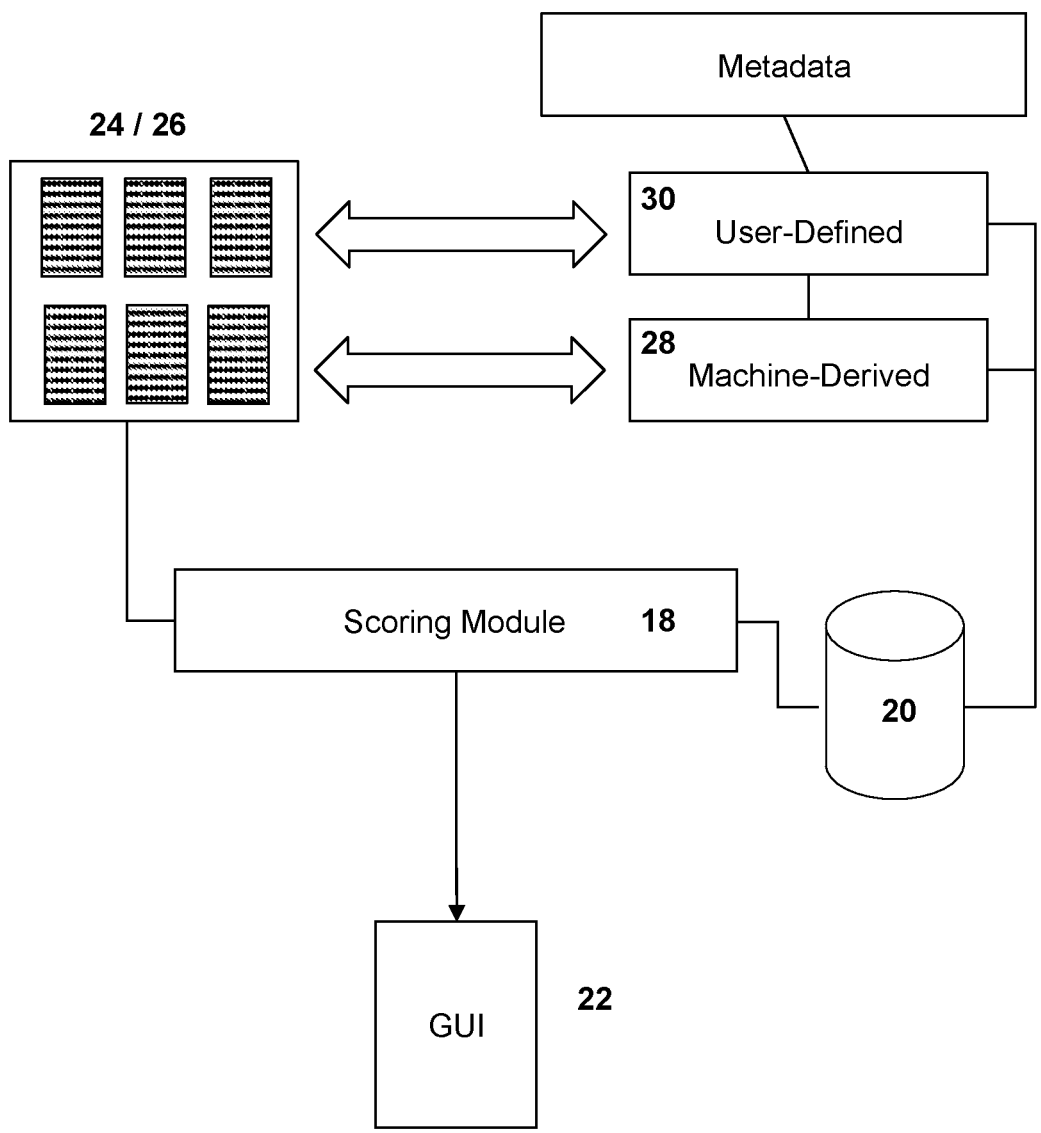
FIG. 3 is a diagram that illustrates the relationship between the written transcripts, metadata (including user-defined and machine-derived metadata), the scoring module, and the database described herein.
Figure 4:
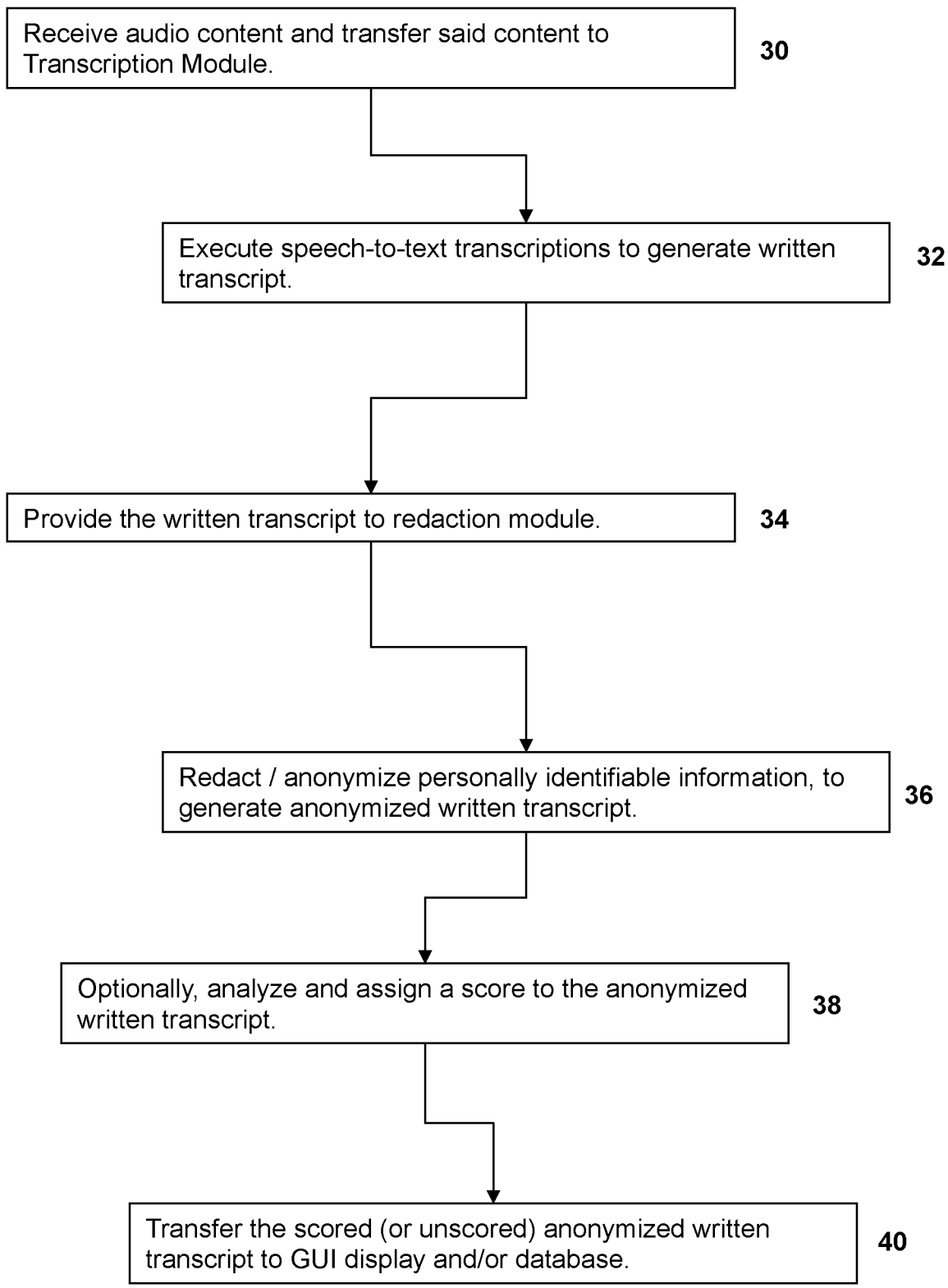
FIG. 4 is a diagram that summarizes certain methods of the present invention.

Referring now to FIGS. 1-4, according to certain preferred embodiments of the present invention, systems and methods for transcribing, redacting, and scoring audio content are provided. In certain embodiments, the systems of the present invention include a central processing unit (CPU) 10, random access memory (RAM) 12, a transcription module 14, a redaction module 16, an optional scoring module 18 (FIGS. 2 and 3), and a database 20—all operably connected and in communication with each other. In addition, in certain embodiments, the systems may further include a graphical user interface (GUI) 22, which is configured to display the written transcripts 24 and anonymized written transcripts 26 described herein. The invention provides that the transcription module 14, redaction module 16, database 20, and optional scoring module 18 may exist within a single unified machine or, alternatively, within two or more separate machines (provided that such components are operably connected and in communication with each other). When the system components are combined into a single machine, the memory component 12 and CPU 10 may be shared among the different components of the system, e.g., a shared memory source 12, a shared processor 10, and a shared user interface 22.

Transcription Module

The invention provides that the transcription module 14 is configured to receive a plurality of audio files generated by a plurality of different sources (e.g., different conversations originating from different people), and to execute speech-to-text transcriptions based on the audio content included within the audio files. The transcription module 14 is configured to then generate written transcripts 24 of such transcriptions, and transmit such written transcripts 24 to the redaction module 16. The speech-to-text transcriptions may be executed in real-time, e.g., as audio content is being created and captured by a microphone (and streamed to the system). As used herein, the term "real-time" means that a specified action occurs immediately following another preceding action, e.g., when the specified action occurs within 1, 2, 4, 8, 16, or 32 seconds from the conclusion of a preceding action. In other embodiments, the transcription module 14 may be provided with a set of audio files that were created over a period of time (i.e., a previously recorded set of audio files may be digitally transmitted to the transcription module 14 of the system). The invention provides that the written transcripts 24 may be formatted as simple contiguous text or, in other embodiments, the written transcripts 24 may be formatted as arrays. The invention provides that a variety of algorithms may be employed to perform the transcription step, including algorithms that may be used to perform speech-to-text, speech-to-phoneme, speech-to-syllable, and/or speech-to-subword conversions. In certain embodiments, Hidden Markov Model algorithms may be employed by the transcription module 14 to execute the transcriptions.

Redaction Module

The invention provides that the redaction module 16 is configured to receive the written transcripts 24 from the transcription module 14, identify personally identifiable information included in the written transcripts 24, and anonymize the personally identifiable information included in the written transcripts 24 to create anonymized written transcripts 26. As used herein, "personally identifiable information" (PII) includes all information that can be used on its own or with other information to identify, contact, or locate a single person, or to identify an individual in context. Non-limiting examples of such personally identifiable information include a person's name; social security number; driver's license and other government identification numbers; birth date and place of birth; home and personal cell telephone numbers; personal email address, mailing and home address; financial information, including bank account numbers, credit card numbers, debit card numbers, etc.; biometric information; and medical-related information.

Numeric forms of personally identifiable information are among the most sensitive, such as social security numbers, account numbers, credit card numbers, debit card numbers, etc., since those forms of personally identifiable information can often be used quickly (and somewhat easily) to misappropriate a person's funds, credit (e.g., make purchases on credit cards), and/or identity. The invention provides that while certain prior art systems exist that are able to identify and redact certain numeric forms of personally identifiable information, such prior art systems often exhibit unacceptable failure rates. More particularly, for example, when audio content is transcribed, and a person speaking articulates a word to identify a numeral, the word (which represents a numeral) is not always recognized as potentially a component of personally identifiable information. For example, some prior art systems may recognize 499-45-1234 as a social security number, but would not recognize the same if presented in a written transcript 24 as "four-nine-nine-four-five-one-two-three-four." Accordingly, the invention provides that redaction module 16 is configured to identify and redact (as described herein) numeric forms of personally identifiable information that are not only presented as numerals, but also words that represent numerals.

In certain preferred embodiments, the invention provides that the redaction module 16 is configured to replace numeric forms of personally identifiable information with randomized substitutes (whether such numeric forms of personally identifiable information include numerals or words representing numerals). For example, if the redaction module 16 identifies 499-45-1234 in a written transcript 24, the redaction module 16 is configured to substitute those numerals with a randomized series of numbers, e.g., 567-23-9876 (or, likewise, if the written transcript 24 shows "four-nine-nine-four-five-one-two-three-four," the redaction module 16 is configured to substitute those words with a randomized series of words that represent numbers, e.g., "five-six-seven-two-three-nine-eight-seven-six").

In certain alternative embodiments, the invention provides that numeric (and non-numeric) forms of personally identifiable information are replaced with symbols that indicate the presence of personally identifiable information within the audio content. For example, if the redaction module 16 identifies 499-45-1234 in a written transcript 24, the redaction module 16 is configured to substitute those numerals with a randomized series of symbols, e.g., *--* or #@$-$#-@#$#@. Still further, in replacement of the numeric (and non-numeric) forms of personally identifiable information, the redaction module 16** may be configured to substitute such personally identifiable information with an error notification, e.g., {Error}.

Once the anonymized written transcripts 26 have been generated, the anonymized written transcripts 26 may be transferred to the database 20, where such anonymized written transcripts 26 are recorded and made accessible for subsequent searching, review, and analysis. Alternately, or in parallel with such transfer, the anonymized written transcripts 26 may be viewed by a user of the system within its graphical user interface (GUI) 22.

Scoring Module

According to still further preferred embodiments, the invention provides that the system may, optionally, include a scoring module 18. The scoring module 18 will preferably enable users of the system described herein to systematically, efficiently, and quantitatively analyze the audio content provided to the system; extract relevant information and data from such audio content (both at the individual and aggregate levels); and report such data to users (preferably in a way that such information and data could later be searched, mined, and reviewed). In certain preferred embodiments, the scoring module 18 is configured to receive the anonymized written transcripts 26 from the redaction module 16 or the database 20 and analyze the anonymized written transcripts 26 and assign a score to each of the anonymized written transcripts 26 (and/or discrete portions thereof). The invention provides that the scores may be correlated to machine-derived metadata 28 and/or user-defined metadata 30 (as described further below).

More particularly, the invention provides that the scoring module 18 is configured, in certain embodiments, to derive correlations between the anonymized written transcripts 26 and certain metadata that are provided to the system. More particularly, the scoring module 18 is configured to receive metadata associated with each of the anonymized written transcripts 26 (or the preceding written transcripts 24), derive correlations between such anonymized written transcripts 26 and metadata, and report such correlations to a user of the system (e.g., in many cases, such correlations may be reported in the form of numeric scores or rankings). In addition, the invention provides that the scoring module 18 is configured to calculate certain scores associated with the audio content and/or derived correlations, such as classifications, rankings, and other numeric scores attributed to the audio content, as well as summarizations and conclusions derived from the correlations mentioned above. The invention provides that, in certain embodiments, the scoring module 18 is configured to derive such correlations between anonymized written transcripts 26 and metadata in real-time (e.g., as audio content is being streamed to the system), and immediately report such correlations (and related scores) to a user of the system in real-time. The invention further provides that the database 20 is configured to receive, record, and make accessible such metadata for future use by the scoring module 18 (and for recording, searching, and reviewing the correlations and scores generated by the scoring module 18). Still further, the invention provides that the scoring module 18 may receive input from human operators—e.g., the classifications, rankings, and other numeric scores attributed to certain audio content may be defined, in whole or in part, by human operators and submitted to the scoring module 18. As described herein, the redaction module 16 makes it possible for such human operators to participate in such scoring functions, without being exposed to personally identifiable information of others.

As mentioned above, the invention provides that the metadata may include various forms of metadata (e.g., such metadata may include user-defined meta data 30 and machine-derived metadata 28). More specifically, the scoring module 18 may utilize certain user-defined metadata 30, which is specified by each of the plurality of different sources (or by the user of the system that is performing a particular analysis). The user-defined metadata 30 may be provided to the system, and recorded in the database 20, through the user interface 22 of the system. In certain embodiments, the provision of such user-defined metadata 30 may also be executed remotely, e.g., through an external Internet portal that is capable of communicating with the database 20 of the system. The user-defined metadata 30 may be categorized into one of a plurality of different pre-defined categories. For example, in the case of certain analyses that a business may want to perform, non-limiting examples of such pre-defined categories may indicate to the user of the system, e.g., whether a person (customer) who is featured in the audio content purchased a product or service, submitted a complaint about a product or service, received unsatisfactory responses to questions submitted, received satisfactory responses to questions submitted, or combinations of the foregoing. Still further, the invention provides that the pre-defined categories of user-defined metadata 30 may include one or more free-form categories, which are entirely defined by and unique to each of the plurality of different sources of audio content. That is, in addition to the common types of metadata that certain types of users may want to analyze (e.g., whether a customer purchased a product), the user may specify certain user-defined metadata 30 that is entirely unique to a particular business/user—e.g., whether specific types of questions are asked of sales people about a specific feature of a specific product or service.

In addition, the invention provides that the metadata may also include certain machine-derived metadata 28, i.e., metadata that are automatically harvested by the system (e.g., the scoring module 18) as it analyzes anonymized written transcripts 26. Non-limiting examples of such machine-derived metadata 28 may include a geographical region from which the audio content originated, demographic information that is correlated with such geographical region, a length of time that represents a duration of the audio content, word count data, word timing data, volume data, speech energy data, tone-related data, amplitude-related data, frequency-related data, rates of change data, and/or combinations or variations of the foregoing. In addition, for example, the invention provides that such machine-derived metadata 28 may include a phone number from which the audio files originated (in such embodiments, the scoring module 18 would need to be presented with the written transcripts 24, before redaction by the redaction module 14). Such machine-derived metadata 28 may further be used to identify a geographical region from which the audio files originated, e.g., based on the area code of the detected phone number. The identified geographical region data may, in turn, be used to correlate additional information about the region, such as an average income level or average net worth of individuals living in the geographical region. The invention provides that the scoring module 18 will be operably connected to, and in communication with, the database 20 that is configured to store such machine-derived metadata 28 (and call up such information when queried by a system user). The invention provides that such machine-derived metadata 28 and associated information may be viewed in real-time (e.g., while the audio files are being analyzed by the system) or anytime thereafter through the user interface 22 of the system.

The invention provides that the scoring module 18 is configured to derive correlations (and the additional outputs and scores mentioned above) between the anonymized written transcripts 26 and the metadata (including both user-defined metadata 30 and machine-derived metadata 28) by detecting, for example, words that are present in the written transcripts a specified minimum number of times, word combinations that are present in the anonymized written transcripts 26, a word in a defined relationship with another word in the anonymized written transcripts 26, semantic content, or combinations or variations of the foregoing. More particularly, in some embodiments, the invention provides that the scoring module 18 may derive correlations between the anonymized written transcripts 26 and metadata using, in part, a set of keywords—e.g., words that are detected in the anonymized written transcripts 26 a specified minimum number of times (words that meet a specified threshold of usage). In such embodiments, the invention provides that a user of the systems described herein may modulate the specified threshold. In addition, the invention provides that keywords may consist of multiple variables, e.g., rules may be created whereby a word must be detected in a defined proximity to other specified words in order for that collection of words (or phrase) to be considered detected in an anonymized written transcript 26. More specifically, in certain embodiments, the invention provides that such analyses, and correlation steps performed by the scoring module 18, may analyze the occurrence of certain words, and the relationships between different words, to determine if certain audio content is present. In addition to frequency of keyword usage, the invention provides that other forms of "machine learning" may be employed to identify correlations between the anonymized written transcripts 26 and metadata (and to calculate the additional scores described herein). The invention provides that the scoring module 18 may be configured to utilize any of various known algorithms to derive correlations between the anonymized written transcripts 26 and metadata. Non-limiting examples of algorithms that may be used in such embodiments include, but are not limited to, algorithms commonly known as C4.5, k-means, SVM (support vector machines), Apriori, EM (expectation-maximization), AdaBoost, kNN (k-Nearest Neighbors), Naive Bayes, CART (classification and regression trees), and/or derivatives of any of the foregoing algorithms.

The invention further provides that the scoring module 18 may be trained using artificial references/metadata. That is, the scoring module 18 may be provided with artificial references/metadata and trained to create correlations between such artificial references/metadata and known or expected outcomes (versus relying solely on actual audio content being provided to the system over time and the actual metadata derived therefrom). Likewise, the invention provides that such artificial references/metadata may be used to "test"—and exert quality control over—the ability of the scoring module 18 to accurately derive classifications, rankings, and other numeric scores attributed to real audio content provided to the system.

The invention provides that the systems described herein may be useful in a variety of applications. For example, the systems may be useful in monitoring sales calls in real-time, and reporting to users whether the call is likely to lead to a sale (or not). In that example, the live audio content streamed to the system may consist of a sales call between a sales representative and a prospective customer. The prediction or score that is generated by the scoring module 18 may be whether the sales call satisfies a defined probability for resulting in a sale, e.g., the defined probability may be 50%, 60%, 70%, or some other percent probability that the sales call will eventually lead to a sale. In such embodiments, the prediction may be reported to the user of the system (or multiple users) via text message, e-mail, visual display within a user interface 22, or a combination of the foregoing. Still further, in such embodiments, the system may be configured to execute a responsive action based on the prediction. In the case of the sales call example, the responsive action may include termination of the sales call, transfer of the sales call from a first sales representative (e.g., a lower ranked sales person) to a second sales representative (e.g., a supervisor), issuing of an electronic notice to one or more persons within an organization, or combinations of the foregoing.

In addition to the systems described herein, the present invention also encompasses methods for transcribing, redacting, and scoring audio content—whereby such methods generally entail operation of the systems described herein. For example, such methods generally entail steps 30, 32, 34, 36, 38, and 40 outlined in FIG. 4, namely: receiving audio content and transferring such content to the transcription module of the system described herein; executing a speech-to-text transcription using the transcription module to generate a written transcript; providing the written transcript to the redaction module; anonymizing personally identifiable information included in the written transcript, to generate an anonymized written transcript; optionally, analyzing and assigning a score to the anonymized written transcript (or portions thereof); and transferring the scored (or unscored) anonymized written transcript to a user interface and/or database for storage therein.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for transcribing, redacting, and scoring audio content, which comprises at least one machine that includes a central processing unit, random access memory, a transcription module, a redaction module, a scoring module, and at least one database in communication with the machine, wherein:
   (a) the transcription module is configured to (i) receive a plurality of audio files generated by a plurality of different sources, (ii) execute speech-to-text transcriptions based on audio content included within the audio files, and (iii) generate written transcripts of such transcriptions;
   (b) the redaction module is configured to (i) receive the written transcripts from the transcription module, (ii) identify personally identifiable information included in the written transcripts, and (iii) anonymize the personally identifiable information included in the written transcripts to create anonymized written transcripts;
   (c) the scoring module is configured to receive the anonymized written transcripts from the redaction module and assign a score to each of the anonymized written transcripts, wherein the scoring module is further configured to calculate each such score based on (i) words that are present in the anonymized written transcripts a specified minimum number of times, wherein the specified minimum number of times may be controlled and modulated by a user of the system; (ii) word combinations that are present in the anonymized written transcripts; (iii) a word in a defined relationship with another word in the anonymized written transcripts; and (iv) semantic content; and
   (d) the database is configured to receive, record, and make accessible for searching and review the anonymized written transcripts generated by the redaction module.

2. The system of claim 1, wherein numeric forms of personally identifiable information are replaced with randomized substitutes, wherein such numeric forms of personally identifiable information include both numerals and words representing numerals.

3. The system of claim 1, wherein numeric and non-numeric forms of personally identifiable information are replaced with symbols that indicate the presence of personally identifiable information within the audio content.

4. The system of claim 3, wherein the symbols include a substituted word, non-alphabetical symbol, random numbers, or an error notification.

5. The system of claim 1, wherein the written transcripts are formatted as simple contiguous text.

6. The system of claim 1, wherein the written transcripts are formatted as arrays.

7. The system of claim 1, wherein the transcription module is configured to execute speech-to-text transcriptions of live audio content in real-time and the redaction module is configured to anonymize the personally identifiable information included within the written transcripts immediately subsequent to such transcriptions being completed.

8. The system of claim 1, wherein the transcription module is configured to execute speech-to-text transcriptions of recorded audio content and the redaction module is configured to anonymize the personally identifiable information included within the written transcripts immediately subsequent to such transcriptions being completed.

9. The system of claim 1, wherein the score is calculated from or correlated to metadata associated with the anonymized written transcripts, wherein such metadata include:
 (a) user-defined metadata;
 (b) machine-derived metadata; or
 (c) a combination of (a) and (b).

10. The system of claim 9, wherein the machine-derived metadata include a geographical region from which the audio content originated; demographic information that is correlated with such geographical region; whether information disclosed in the audio content warrants privacy protection; a length of time that represents a duration of the audio content; tone-related data; amplitude-related data; frequency-related data; rates of change data; or combinations of such machine-derived metadata.

11. The system of claim 1, wherein the transcription module, redaction module, database, and scoring module exist within two or more separate machines.

12. The system of claim 1, wherein the transcription module, redaction module, database, and scoring module exist within a single unified machine.

13. The system of claim 1, which further comprises a graphical user interface that is configured to display the written transcripts.

* * * * *